April 9, 1935.　　　F. G. HUGHES　　　1,996,809

SEPARATOR FOR ANTIFRICTION BEARINGS

Filed Jan. 14, 1931

INVENTOR:
FREDERICK G. HUGHES,
BY
HIS ATTORNEY.

Patented Apr. 9, 1935

1,996,809

UNITED STATES PATENT OFFICE 1,996,809

SEPARATOR FOR ANTIFRICTION BEARINGS

Frederick G. Hughes, Bristol, Conn., assignor, by mesne assignments, to General Motors Corporation, Detroit, Mich., a corporation of Delaware Application January 14, 1931, Serial No. 508,627

11 Claims. (Cl. 308—201)

This invention relates to separators for antifriction bearings and comprises all the features and aspects of novelty herein disclosed. An object of the invention is to provide a simple and inexpensive separator having, among other things, the advantages of one-piece construction and quietness of operation. Another object is to provide a process of manufacturing such separator.

To these ends and to improve generally upon devices of this character, the invention further consists in the various matters hereinafter described and claimed. In its broader aspects, the invention is not necessarily limited to the specific disclosure herein selected for illustrative purposes in which Fig. 1 is a perspective view of the completed separator.

Figure 1:
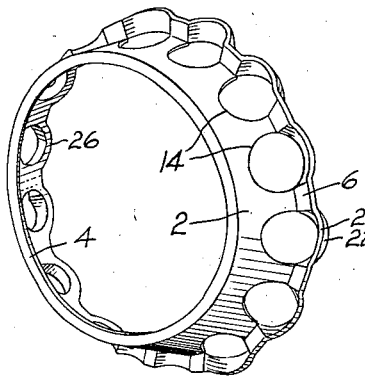

In manufacturing the separator, a flanged ring is first formed, as by drawing sheet metal into dish-pan shape and piercing the bottom wall. This leaves a straight body wall 2 (which may be flaring or conical) connecting an inturned stiffening flange 4 and an out-turned flange 6, the flanges preferably being substantially at right angles to the axis of the ring. The wall 2 is then pierced as by a punch 8. When the separator is used to guide balls, the punch is preferably a segment of a cylinder, the cylindrical surface being connected by a rounded surface 10 to a flat side 12. The radius of the cylindrical surface is desirably somewhat larger than that of the balls and the punch is preferably reciprocated normal to the wall 2 with the flat side 12 close up to the flange 6. The flanged ring thus acquires a series of openings 14 each having the shape of a segment of a circle. The concave edges of the segmental openings preferably terminate at the flange 6.

Figure 2:
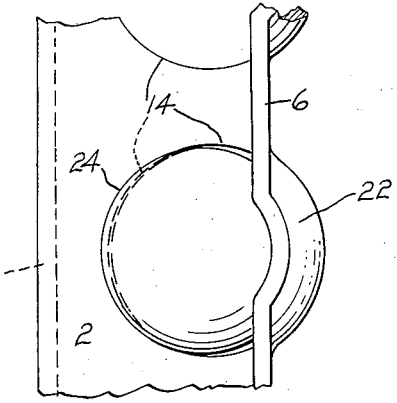
Fig. 2 is an enlarged outside view of a portion of the separator.
Figures 3, 4:
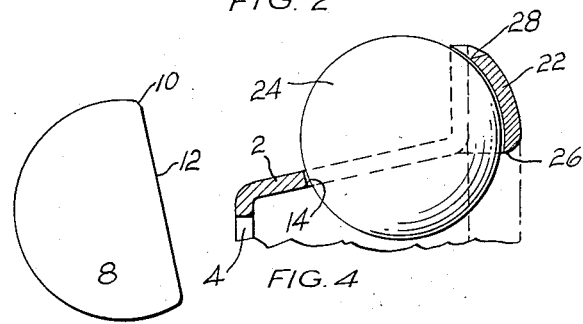
Fig. 3 is an end view of a punch.
Fig. 4 is a cross sectional view of Fig. 2.
Figure 5:
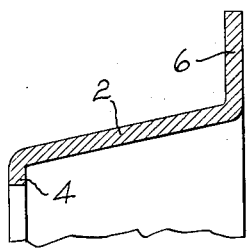
Fig. 5 is a sectional view of a flanged ring from which the separator is formed.
Figures 6, 8:
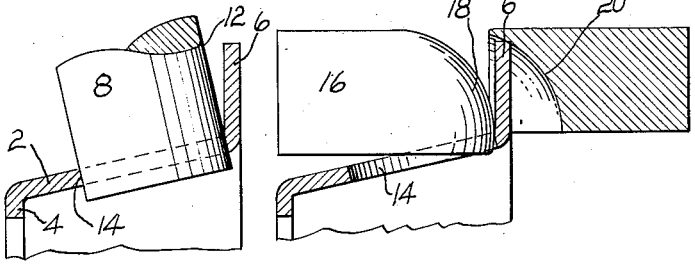
Fig. 6 is a sectional view illustrating the piercing operation.
Fig. 8 is a sectional view illustrating a pocket forming operation.
Figure 7:
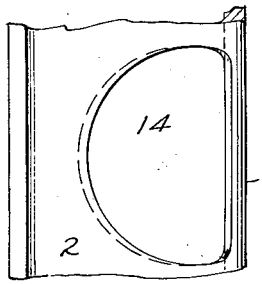
Fig. 7 is an inside view of a portion of the separator after the piercing operation.

Next the flange 6 is subjected to a forming operation by a plunger 16 whose end has the shape of a spherical segment 18 for co-operation with a similarly shaped die surface 20. Those portions of the flange 6 which are opposite to the openings 14 are expanded or cupped outwardly as at 22 to complete a series of pockets for balls 24. Thus, the concave edge of each segmental opening 14 engages a portion of the circumference of a ball at one side thereof only, and each mating portion 22, which is cupped outwardly between the ends of such concave edge, is substantially complemental to the segmental opening to present a surface engaging the ball on the other side thereof. Elsewhere, the ring is out of contact with the ball. The radius of each segment 18 is preferably very slightly larger than the ball radius so that the cupped side portions 22 of the pockets conform to the balls and will thus hold a film of lubricant. Expansion is carried to such a point that the inner edges 26 and the outer edges 28 of the pocket surfaces 22 are located a distance slightly less than ball diameter from the opposite edges of the openings 14. Thus the separator also acts as a retainer or cage for the balls which can be sprung in past the yieldable edges 28. In Figs. 2 and 4, the center of the ball will be outside the body wall and a little to the left of the center of the segmental opening 14 and since the ball has the smaller radius, it will clear the edge of the opening in the region of the flange 6 and near the middle of the ring.

The separator ring has a portion of its body wall 2 circumferentially continuous at that side of the row of openings which is opposite to the flange 6. By extending the segmental openings to the flange 6, portions of the flange opposite to the openings are freed from the body wall for outward cupping. Those portions of the body wall between the openings space the balls apart, and those portions of the flange 6 at the terminal edges of these spacing portions remain straight and in alignment with the terminals of the arcuate edges 14.

Figure 9:
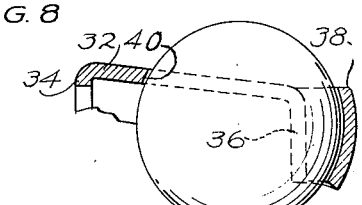
Fig. 9 is a sectional view of a modification.

In Fig. 9, a modification is shown wherein a ring 32 has a pair of inwardly extending flanges 34 and 36, parts of the flange 36 being expanded to form ball holding walls 38 which mate with ball openings 40 in the body of the ring. Except that the flange 34 extends in the same direction as flange 36, this form is somewhat like a reversal of Fig. 1.

I claim:

1. In a ball separator and retainer, a ring comprising a body wall and a flange, the body wall having segmental openings terminating at the flange and the flange having outwardly cupped side portions opposite to said segmental openings to complete a series of pockets, and balls in the pockets, the edges of the segmental openings being a smaller distance than ball diameter from the outer and inner edges of the cupped side portions of the flange to hold the balls in the pockets; substantially as described.

2. In a ball separator and retainer, a ring comprising a body wall and a flange, the body wall having segmental openings and the flange having outwardly cupped side portions opposite to said segmental openings to complete a series of pockets, and balls in the pockets, the edges of the segmental openings being a smaller distance than ball diameter from the outer and inner edges of the cupped side portions of the flange to hold the balls in the pockets, and one edge of each cupped side portion of the flange being yieldable to provide for snapping the balls into the pockets; substantially as described.

3. In a ball separator, a ring comprising a flaring body wall and a flange extending outwardly from that edge of the body wall which has the greater diameter, the body wall having segmental openings and the flange having outwardly cupped side portions opposite to said segmental openings to complete a series of pockets, and balls in the pockets and having their centers located outside the flaring body wall, the edges of the segmental openings clearing the balls adjacent to the middle of the ring; substantially as described.

4. In a separator, a ring having pockets, rolling elements in the pockets, the ring comprising a body wall and a flange, the body wall having openings whose edges terminate at the flange on one side of the ring, the body wall having a circumferentially continuous portion at those sides of the openings which are opposite to the flange, the edges of such openings engaging the rolling elements on one side only, the flange being cupped outwardly between the ends of said edges and engaging the other sides of the rolling elements to complete the pockets therefor, and the ring being elsewhere out of contact with the rolling elements; substantially as described.

5. In a separator for antifriction rolling elements, a ring having pockets for the rolling elements and comprising a body wall and a flange, one side of each pocket being formed by the arcuate edge of a segmental opening in the body wall and the other side being formed by an outwardly cupped side surface on the flange, such surface being opposite to and complemental to the arcuate edge; substantially as described.

6. In a cage for antifriction balls, a ring having pockets for the balls and comprising a body wall and a flange, one side of each pocket being formed by the arcuate edge of a segmental opening in the body wall and the other side being formed by an outwardly cupped spherical surface on the flange, the center of each ball being located between lines connecting the arcuate edge at one side of the pocket with the outer and inner extremities of the spherical surface, and such lines being shorter than the diameter of the balls; substantially as described.

7. In a separator for rolling elements, a ring having pockets for the rolling elements and comprising a body wall and a flange, one side of each pocket being formed by the arcuate edge of a segmental opening in the body wall, the body wall having a circumferentially continuous portion at that side of the ring which is opposite to the flange, the other side of each pocket being formed by an outwardly cupped side surface on the flange, such surface being opposite to and complemental to the arcuate edge; substantially as described.

8. In a separator for rolling elements, a ring having pockets for the rolling elements and comprising a body wall having a circumferentially continuous portion at one side and a flange at the other side, the body wall having segmental openings extending from said continuous portion of the body wall to the flange, the segmental openings having their non-arcuate portions away from said continuous portion, those portions of the flange between the openings being aligned with said non-arcuate portions, and those portions of the flange directly opposite to the segmental openings being cupped outwardly and cooperating with the arcuate edges of the openings to form pockets preventing the rolling elements from escaping from the ring; substantially as described.

9. In a separator for antifriction balls, a ring comprising a body wall and a flange, the body wall having segmental openings and ball separating portions between the segmental openings, the portions of the flange at the terminals of the separating portions being substantially straight and the remaining portions of the flange being cupped outwardly opposite to the segmental openings to complete a series of ball pockets, and balls in the pockets; substantially as described.

10. In a separator for rolling elements, a ring having pockets for the rolling elements and comprising a body wall having a circumferentially continuous portion at one side and a flange at the other side, the body wall having segmental openings extending from said continuous portion of the body wall to the flange to free portions of the flange from the body wall, and such freed portions being cupped outwardly away from the segmental openings to complete a series of pockets, and rolling elements in the pockets; substantially as described.

11. In a separator for antifriction balls, a ring comprising a body wall and a flange, the body wall having segmental openings therein extending on one side to the flange to free portions of the flange from the body wall, said freed portions of the flange being cupped outwardly away from the arcuate edges of the segmental openings and being complemental thereto to form ball pockets, balls in the pockets, and the terminal edges of the cupped portions being each a distance less than ball diameter from the opposed arcuate edges to hold the balls from escape in any direction; substantially as described.

FREDERICK G. HUGHES.